US009836981B2

(12) United States Patent
Skeete et al.

(10) Patent No.: US 9,836,981 B2
(45) Date of Patent: Dec. 5, 2017

(54) PUZZLE TEACHING SYSTEM

(71) Applicants: John David Skeete, Calgary (CA);
Jacqueline Ann Fields, Calgary (CA)

(72) Inventors: John David Skeete, Calgary (CA);
Jacqueline Ann Fields, Calgary (CA)

( * ) Notice: Subject to any disclaimer, the term of this patent is extended or adjusted under 35 U.S.C. 154(b) by 0 days.

(21) Appl. No.: 14/753,978

(22) Filed: Jun. 29, 2015

(65) Prior Publication Data

US 2016/0379503 A1 Dec. 29, 2016

(51) Int. Cl.
*A63F 9/10* (2006.01)
*G09B 1/36* (2006.01)
*A63F 9/06* (2006.01)

(52) U.S. Cl.
CPC .............. *G09B 1/36* (2013.01); *A63F 9/0612* (2013.01); *A63F 9/10* (2013.01); *A63F 2250/28* (2013.01)

(58) Field of Classification Search
CPC ................ A63F 9/10; A63F 2009/1005; A63F 2009/1033; A63F 2009/1077; A63F 2009/1066; A63F 2009/1061; G09B 1/36; G09B 1/38
See application file for complete search history.

(56) References Cited

U.S. PATENT DOCUMENTS

| 941,680 | A | * | 11/1909 | Houghton | A63F 9/10 273/157 R |
| 2,570,625 | A | * | 10/1951 | Zimmerman | A63H 33/046 273/157 R |
| 2,674,813 | A | * | 4/1954 | Hutchinson | A63F 3/0449 273/156 |
| 2,923,550 | A | * | 2/1960 | Blackman | A63F 9/10 273/157 R |
| 3,682,479 | A | * | 8/1972 | Miller | A63F 9/12 273/157 R |
| 4,083,123 | A | * | 4/1978 | Livermore | A63F 9/10 273/157 R |
| 4,797,102 | A | * | 1/1989 | Forsyth | G09B 27/08 434/147 |
| 4,799,680 | A | * | 1/1989 | Weimar | A63F 9/0613 273/157 A |
| 4,893,817 | A | * | 1/1990 | Shilo | A63F 9/10 273/157 R |
| 4,937,181 | A | * | 6/1990 | Rogers | G09B 1/06 273/157 R |
| 5,127,652 | A | * | 7/1992 | Unger | A63F 9/0278 273/157 R |
| 5,217,226 | A | * | 6/1993 | Christopher | A63F 9/10 273/157 A |
| 5,577,728 | A | * | 11/1996 | Kondo | A63F 9/0613 273/157 A |
| 5,735,521 | A | * | 4/1998 | Klimpert | A63F 9/10 273/157 R |

(Continued)

*Primary Examiner* — Steven Wong
(74) *Attorney, Agent, or Firm* — David W. Barman

(57) ABSTRACT

A map system is provided whereby a plurality of individual puzzle pieces have a first upper planar surface and a second lower planar surface and are arranged in either a first unassembled configuration or a second assembled configuration to form a complete map, whereby at least one of complementary magnet pairs, complementary electronic sensors, complementary printed indicia, or combinations thereof are positioned on said lower planar surface for assembling into the assembled configuration.

4 Claims, 10 Drawing Sheets

(56) References Cited

U.S. PATENT DOCUMENTS

| | | | | |
|---|---|---|---|---|
| 5,813,154 | A * | 9/1998 | Wilford | G09F 7/04 273/157 R |
| 5,823,532 | A * | 10/1998 | Goldwasser | A63F 9/1044 273/157 A |
| 5,895,044 | A * | 4/1999 | Bahramian | A63F 9/1288 273/156 |
| 5,988,366 | A * | 11/1999 | Krull | G09B 19/18 206/0.84 |
| 6,712,358 | B1 * | 3/2004 | Dimitriou | A63F 9/088 273/156 |
| 8,074,989 | B1 * | 12/2011 | Bassett | A63F 9/0001 273/157 R |
| 8,491,311 | B2 | 7/2013 | Bodner | G09B 7/00 434/118 |
| 8,573,596 | B2 * | 11/2013 | Gearty | A63F 9/10 273/157 R |
| 2002/0105138 | A1 * | 8/2002 | Juenger | A63F 9/12 273/157 R |
| 2003/0162160 | A1 * | 8/2003 | Horchler | A63F 9/10 434/406 |
| 2004/0032080 | A1 * | 2/2004 | Wells | A63F 9/10 273/157 R |
| 2005/0049023 | A1 * | 3/2005 | Foster | A63F 9/10 463/9 |
| 2005/0248090 | A1 * | 11/2005 | Anders | A63F 9/0865 273/156 |
| 2009/0026701 | A1 * | 1/2009 | Khatai | A63F 3/0434 273/157 R |
| 2009/0047648 | A1 * | 2/2009 | Ferreira | G09B 5/02 434/323 |
| 2010/0327527 | A1 * | 12/2010 | Bianco | A63F 9/10 273/157 R |
| 2011/0031689 | A1 * | 2/2011 | Binder | A63F 9/1011 273/157 R |
| 2011/0042893 | A1 * | 2/2011 | Someya | A63F 9/10 273/157 R |
| 2011/0148040 | A1 * | 6/2011 | Bianco | A63F 9/10 273/157 R |
| 2013/0154188 | A1 * | 6/2013 | Burrows | A63F 9/10 273/157 R |
| 2013/0175757 | A1 * | 7/2013 | Wu | A63F 3/00694 273/157 R |

* cited by examiner

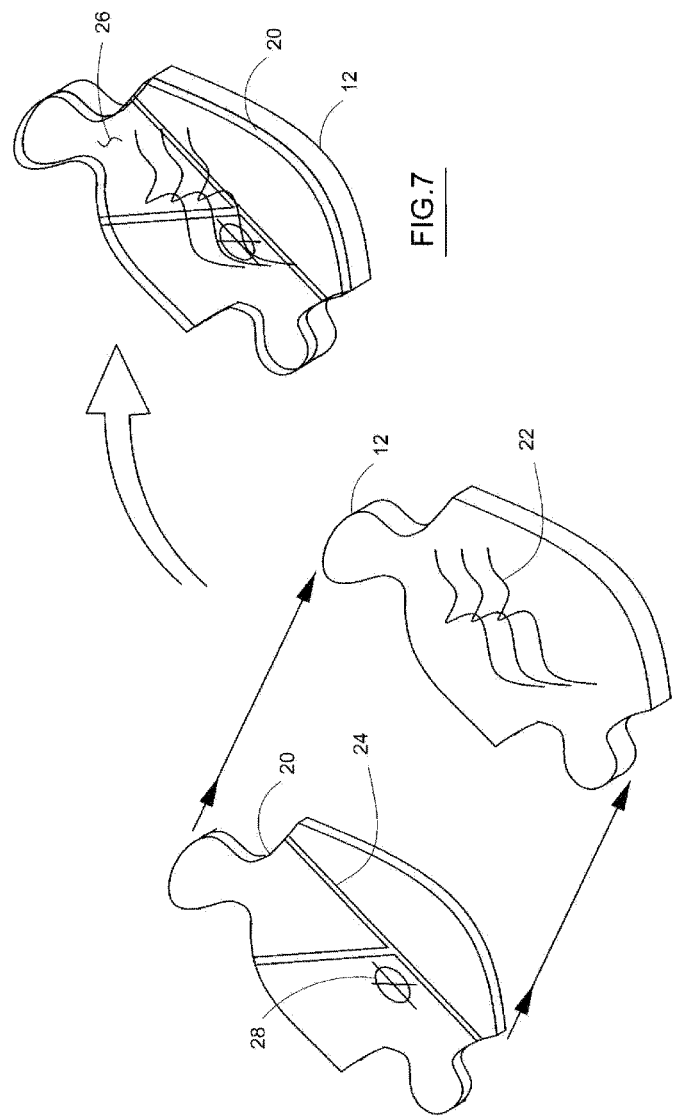

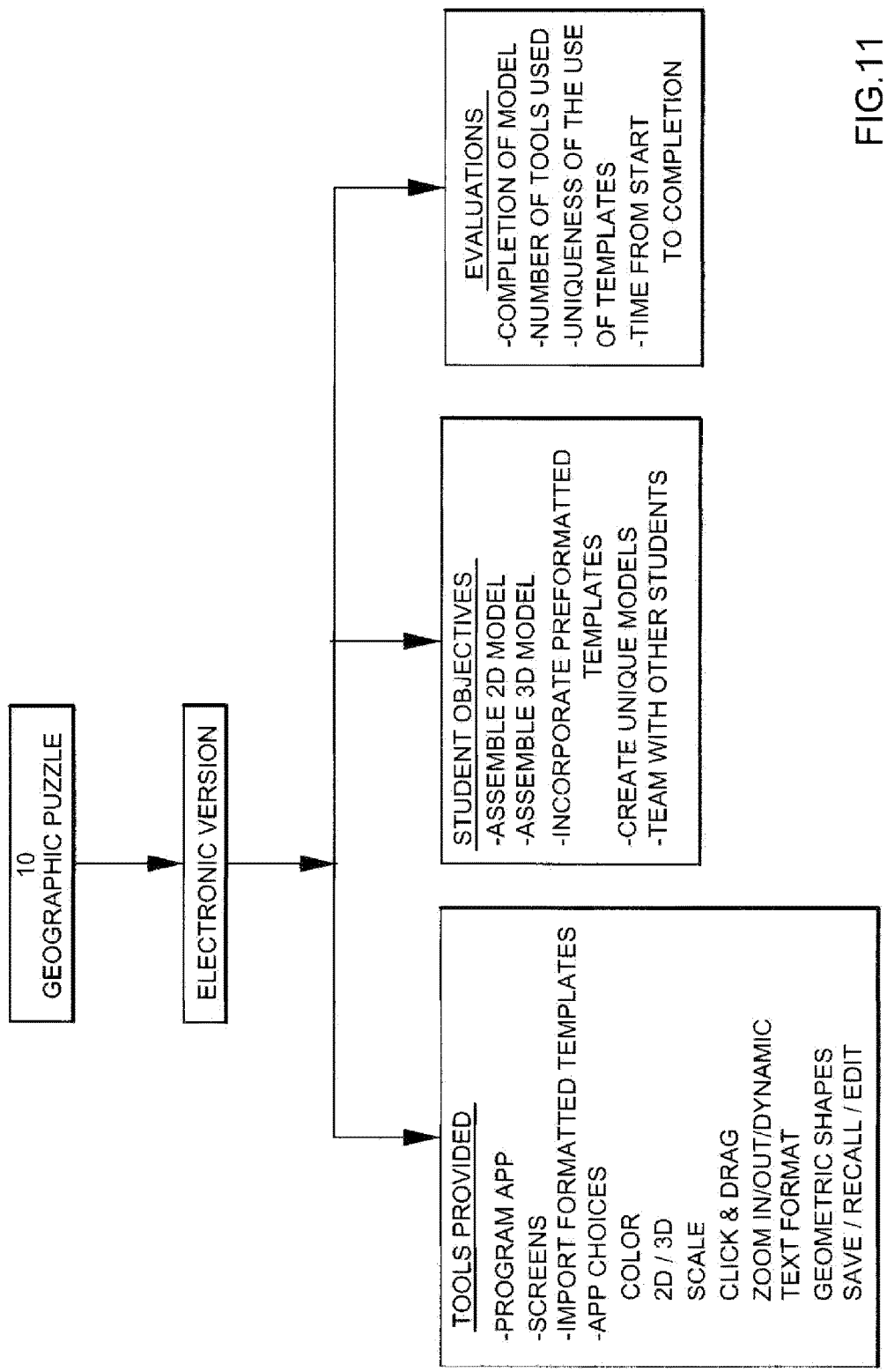

PUZZLE TEACHING SYSTEM

BACKGROUND OF THE INVENTION

The use of puzzles as a learning tool has been demonstrated to be quite effective. There are many instances where puzzles to teach things such as geography and other subjects often contain limitations. There are students that have great difficulty with the spatial relationships relating to puzzles that would benefit from an advanced puzzle system. The present invention fulfills this niche.

SUMMARY OF THE INVENTION

The present invention is both an interactive educational and recreational puzzle that requires in depth knowledge of geographical locations in order to assemble. The physical product can be made from pulp board, wood, plastic, acrylic, combinations thereof and the like. The electronic version requires a computerized digital interface.

The overall long term objective is for companies across the globe to adopt and market the product; with each company attaching its own unique brand. At the local level the aim is for people of all ages to become fully engaged with, and enjoy an innovative educational conceptual representation of landmasses across the globe.

Note: The following are details illustrative for each category of functions. The invention is not limited by the illustrative examples.

Manual 2-Dimensional and 3-Dimensional (2-D/3-D) Versions

- This version requires the user to assemble loose, jumbled pieces that make up the physical layout of the landscape.
- Jumbled pieces assume the shape of each parish and can be marked with the parish name or be unmarked depending on the level of complexity desired and/or the educational level of the user. The unmarked pieces will test memory and accuracy and gives user the opportunity to identify/name the parish on their own.
- Options are provided for jumbled pieces to be color-coded, with unique colors to serve as identifiers for specific features such as rainfall concentration, type of vegetation, and naturally occurring resources.
- For combination displays, appropriately sized transparent overlays (suggested maximum of three per parish) identifying historic places of interest/landmarks, primary economic activity, and population settlement are provided via special order.
- Color-coded stickers (miniature circles, stars, rectangles, squares) serve as identifiers for traditional local cultural attractions such as rum shops and village vendors. (Naturally, these will vary from country to country).

Computerized 3-Dimensional (3-D) Version

The 3-D version is a computerized interface that will present a more realistic visual model of the landscape. Elevated representations will bring the different terrain to life. The ability to change screens will enable the user to play an interactive fun game while simultaneously developing/enhancing motor skills, eye and hand coordination, memory, speed, and accuracy.

Creating and clicking on different screens, tabs, and animated characters will allow the user to:

- Select/click on jumbled pieces to pull them together into shape of map all at once.
- Select/click on map to break apart the finished formation all at once.
- Increase/decrease the heights of elevations using a 'zoom' feature.
- Create different, and change the intensity of, color schemes at will.
- Easily calculate geographical measurements e.g. heights and distances.
- Separate individual pieces of terrain from the whole formation.
- Resize puzzle pieces and inherent features.
- Highlight rivers, lakes, and bodies of water to distinguish them from each other and from land masses.
- Click and drag 'overlay' icons to illustrate a combination of several features on a single parish/area.
- Click and drag on an animated character to embark on adventure trail hikes etc.
- Select/click a tab that produces sound to accompany and compliment animation.
- Select/click a tab shows a variety of animated characters that offers a wide choice.
- Complete time-sensitive assembly of the puzzle thereby testing personal accuracy, speed, memory, and coordination by following a step-by-step process of selecting screens that set a time limit for completing a specific number of activities and which specify the type of activities to be completed.
- Access screen that automatically spits out test result with accompanying animated message, such as "congratulations" or "sorry . . . try again?" or appropriate "smiley face".

Teacher/Instructor-LED Functionality

- All pieces of the map are marked on the back with an identifier number starting at "1". The numbers run chronologically so that teacher/instructor can readily identify where each piece should be placed and can quickly fit the all pieces together to form the finished map when necessary.
- Unmarked pieces (no parish names) aid teacher/instructor's ability to test users' memory, speed, and accuracy during quizzes and interactive recreational sessions.
- Marked, color-coded pieces (i.e. stickers) aid teacher/instructor's ability to initiate learning activities: identification, recognition, recall, and coordination, especially in very young children.
- Color code and shape chart or legend are provided for teacher/instructor to readily identify the meanings of the different stickers thereby facilitating teaching and time efficiency.
- Special additional pieces that fit into (or could be attached to) one extreme corner of the finished puzzle, but outside of the actual map formation, that replicate a happy/sad smiley face and/or thumbs up/down smiley face. These are especially suited to young children as a reward for a job well done or as a motivator for them to try again and do better.

Educational and Recreational Functionality (Geared Especially to Meet the Needs of the Elderly and Visually Challenged User) 2-D Version:

- Large sized puzzle pieces.
- Very bold/bright colored pieces to facilitate easier visibility and differentation of features.
- Large sized bold/brightly-colored stickers.
- Large sized lettering on the overlays.
- Braille encrypted lettering/symbols on the individual pieces to cater to the severely visually impaired.

3-D Version:

- Braille-compatible computerized interface.

Braille encrypted touch screen compatibility that facilitates the challenged user's navigation through the activities.

Voice activated guide when screen is touched so user can access and use all features to necessary to complete the activities.

Voice activation and touch screen interface that allow users to issue basic commands (e.g. "zoom out", "zoom in", "change", "brighten", "stop") which helps them to complete activities

BRIEF DESCRIPTION OF THE SEVERAL VIEWS OF THE DRAWING

FIG. 6 demonstrates a transparent overlay on a single piece according to one embodiment of the present invention.

FIG. 7 demonstrates the transparent overlay placed in position on a single piece according to the present invention.

FIG. 11 is a flow chart demonstrating an electronic puzzle embodiment according to one embodiment of the present invention.

DETAILED DESCRIPTION OF THE PREFERRED EMBODIMENT

Figure 1:
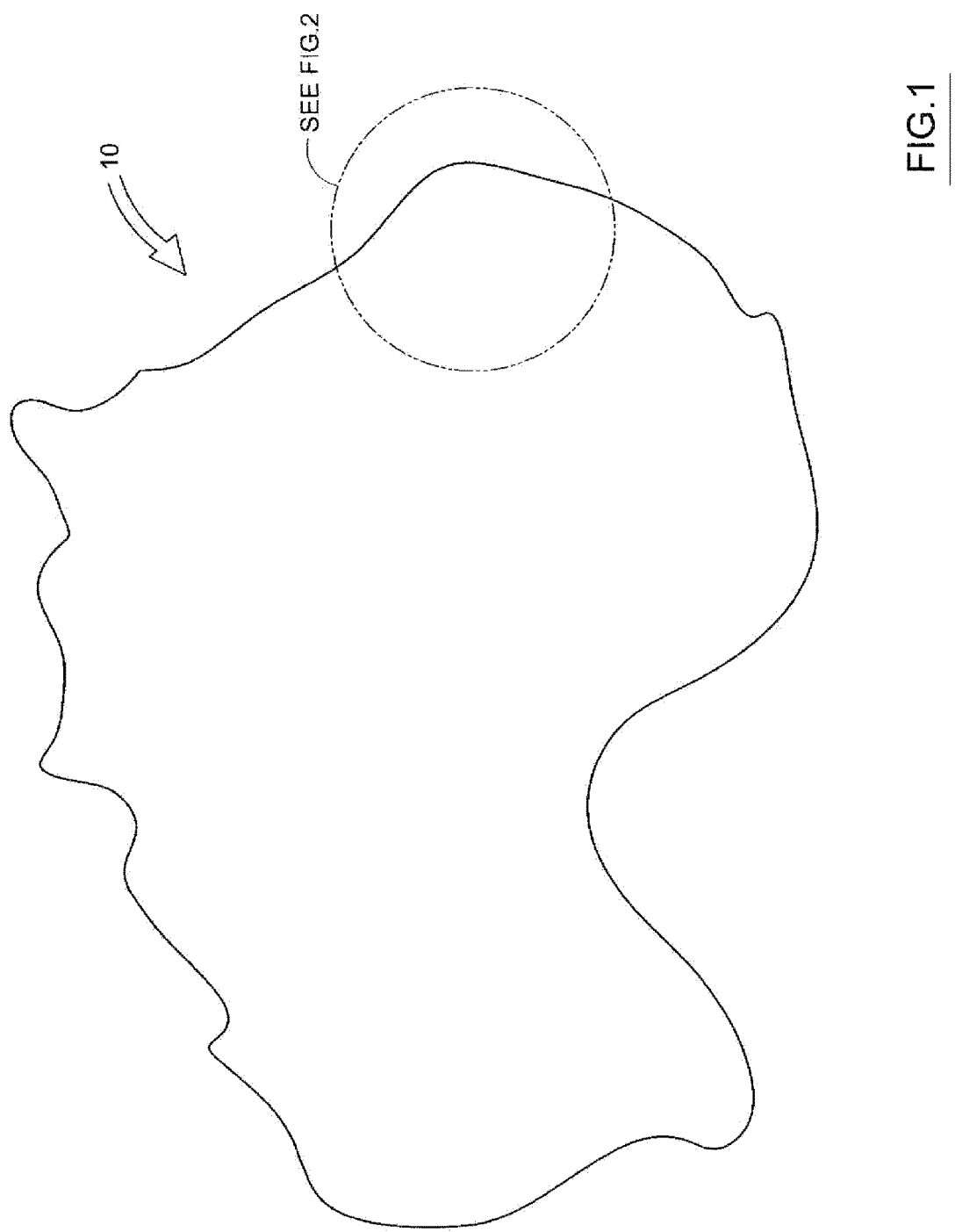
FIG. 1 is a plan view of an entire map according to one embodiment of the present invention.
Figure 2:
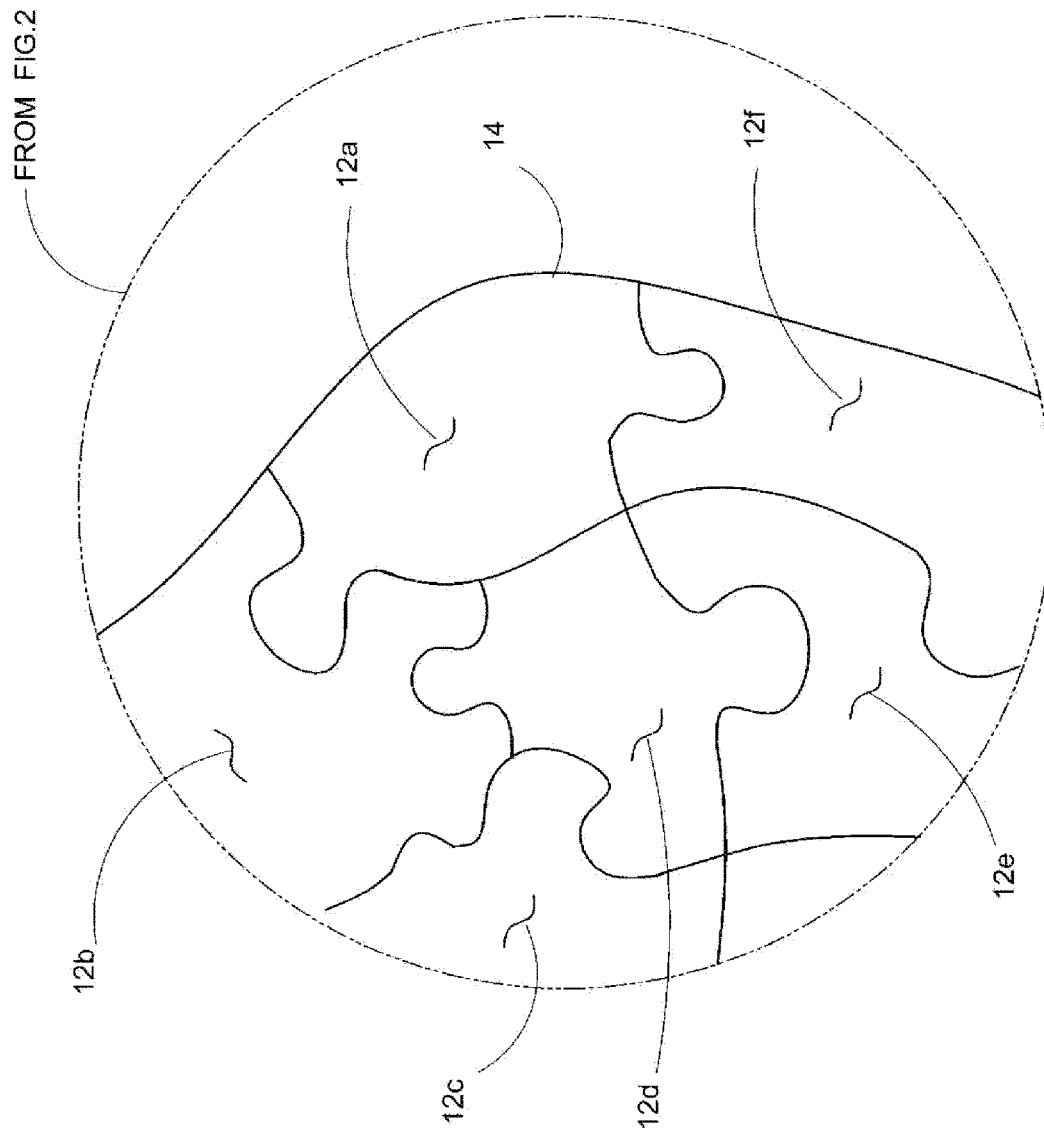
FIG. 2 is an enlarged view from the region indicated in FIG. 1.
Figure 4:
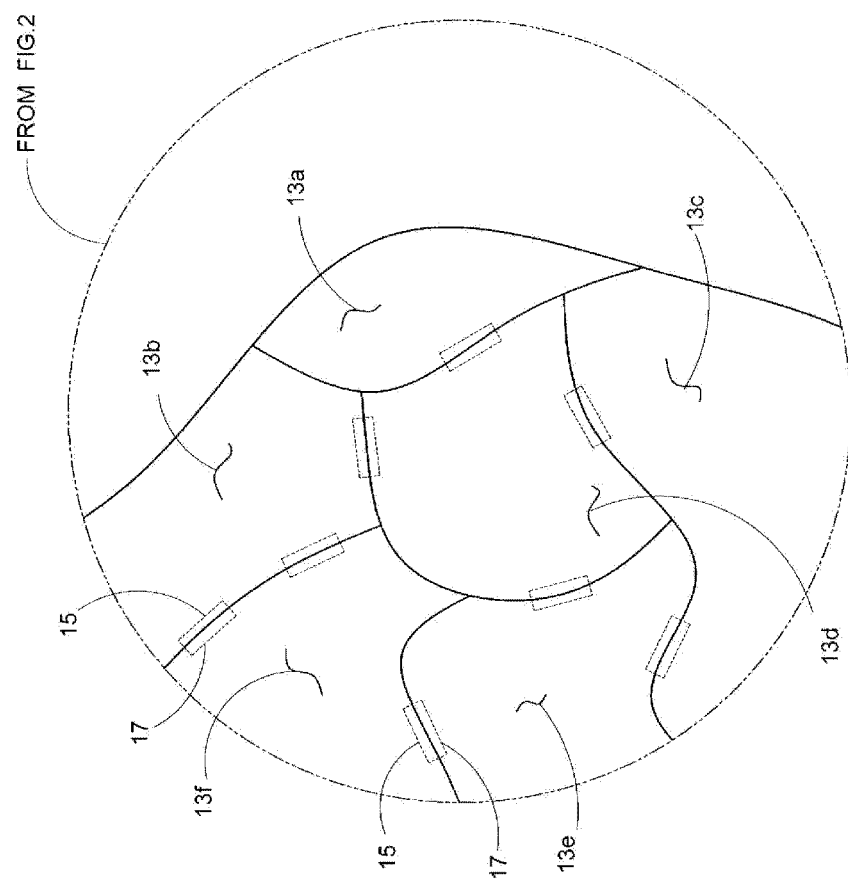
FIG. 4 is an enlarged view of one embodiment of the present invention demonstrating magnetic adhering method.
Figure 5:
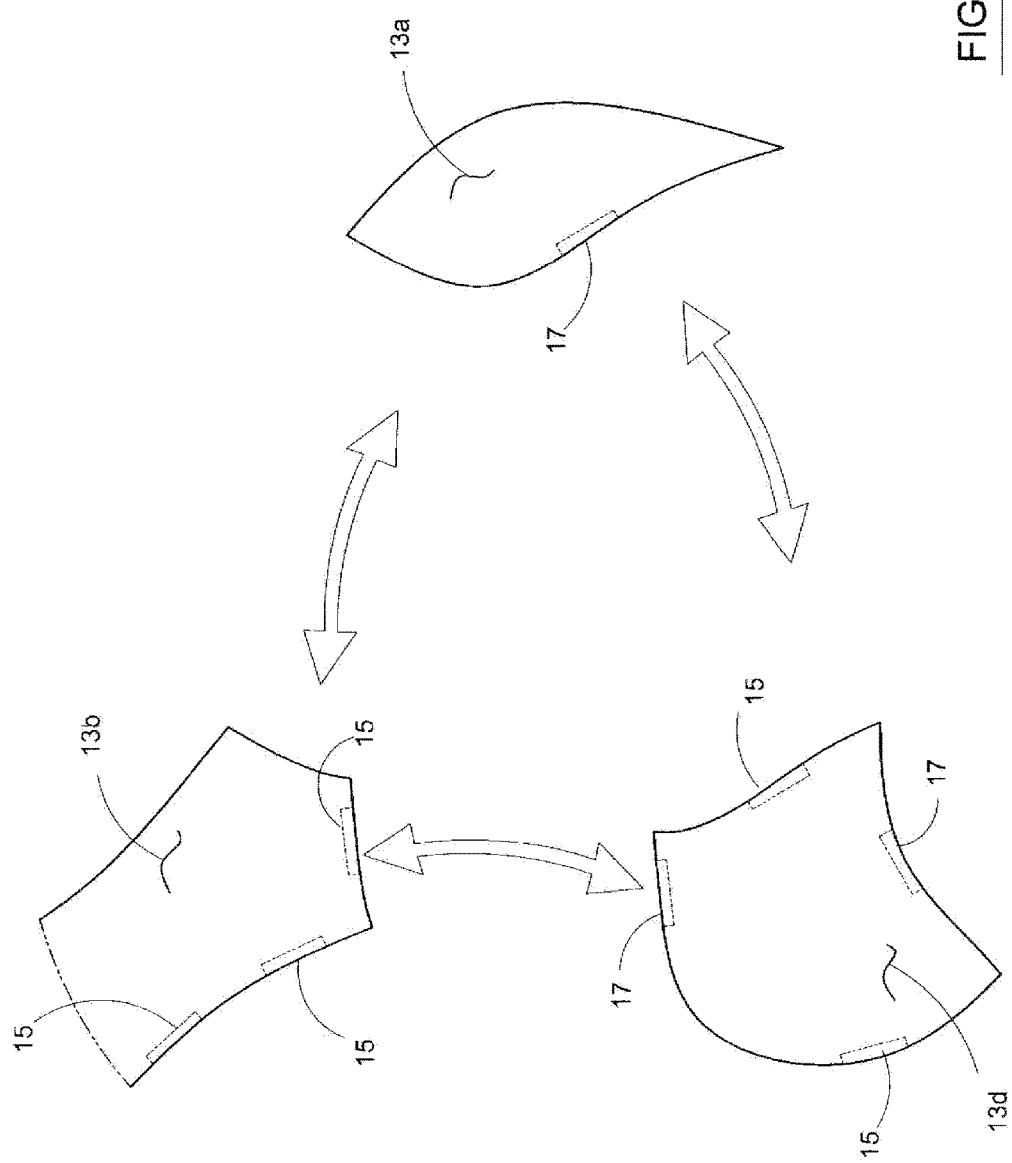
FIG. 5 is demonstrative of pieces used according to the present invention demonstrating placements of magnets.
Figure 8:
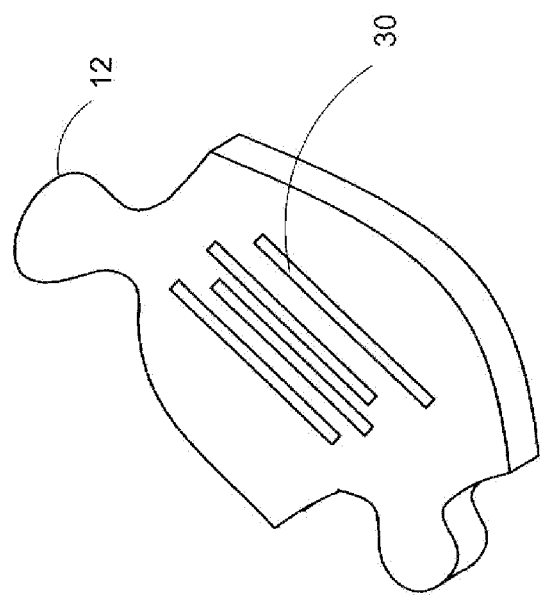
FIG. 8 is demonstrative of a Braille embodiment according to the present invention.

The present invention relates to a new map/puzzle system particularly useful for teaching. Map system 10 is assembled using either interlocking puzzle pieces 12 or magnetic adhering pieces 13. As demonstrated in FIG. 2, puzzle pieces 12a, 12b, 12c, 12d, 12e and 12f are representative of individual puzzle pieces that are assembled to form a complete map. In one embodiment of the present invention, puzzle pieces 13, as demonstrated in FIG. 4, include complimentary positioned magnets, such as first magnet 15 and second magnet 17. As generally understood, each of first magnet 15 and second magnet 17 are selected such that there is a magnetic attraction. For example, magnet 15 would be a magnet with a positive pole, and magnet 17 would be a magnet with a negative pole. This example is not meant to be limiting and any configuration in which attraction occurs is contemplated using the present invention. Discrete fit puzzle pieces 13a, 13b, 13c, 13d, 13e and 13f represent individual puzzle pieces that are joined using complimentary first magnet 15 and second magnet 17.

Figure 3:
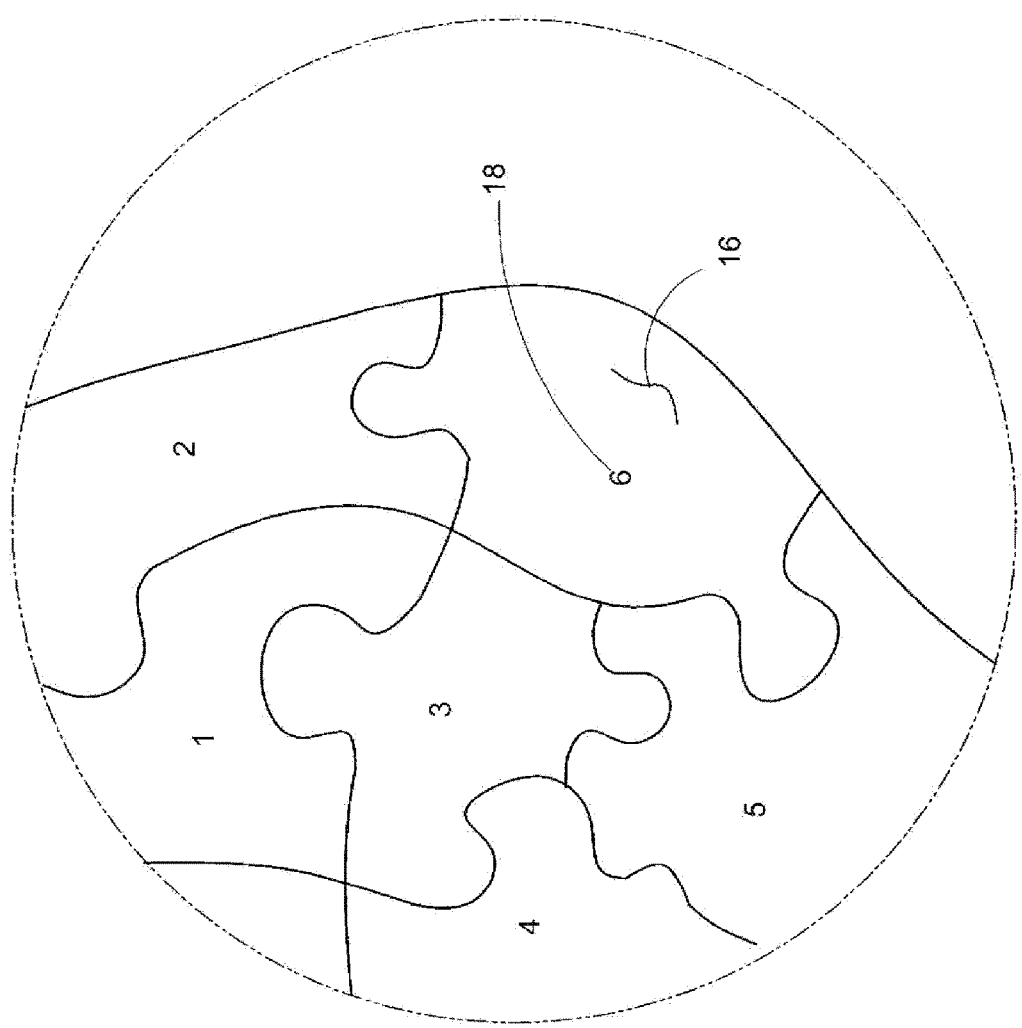
FIG. 3 is a reverse/bottom view from FIG. 2.

Map 10 has an edge portion 14 as is generally understood in the assembling of puzzles from discrete pieces. In one embodiment, puzzle piece 16 has identification indicia 18 disposed thereon, whereby puzzle can be assembled based on the indicia. As demonstrated in FIG. 3, indicia 18 is represented by the numerals 1, 2, 3, 4, 5, 6, and individual pieces 18 are assembled according to ordering the pieces in numerical order.

In one embodiment, as demonstrated in FIGS. 6 and 7, an individual piece 12 is coupled with a transparent overlay 20. Transparent overlay 20 covers at least a part of an individual piece. Although the figure demonstrates this using individual piece 12, the present invention contemplates using the transparent overlay 20 with any individualized piece. Transparent overlay 20, in one embodiment, has graphic indicia 22 disposed thereon. Transparent overlay 20, in one embodiment, could have any one of graphics 22, overlay graphic 24, color coded indicia 28, for a resultant combination of any one of these 26.

In another embodiment of the present invention, puzzle piece 12 includes raised indicia 30. Raised indicia can include Braille or any other raised indicia that is constructed and arranged and contemplated to be used with persons having sight impairments.

Figure 9:
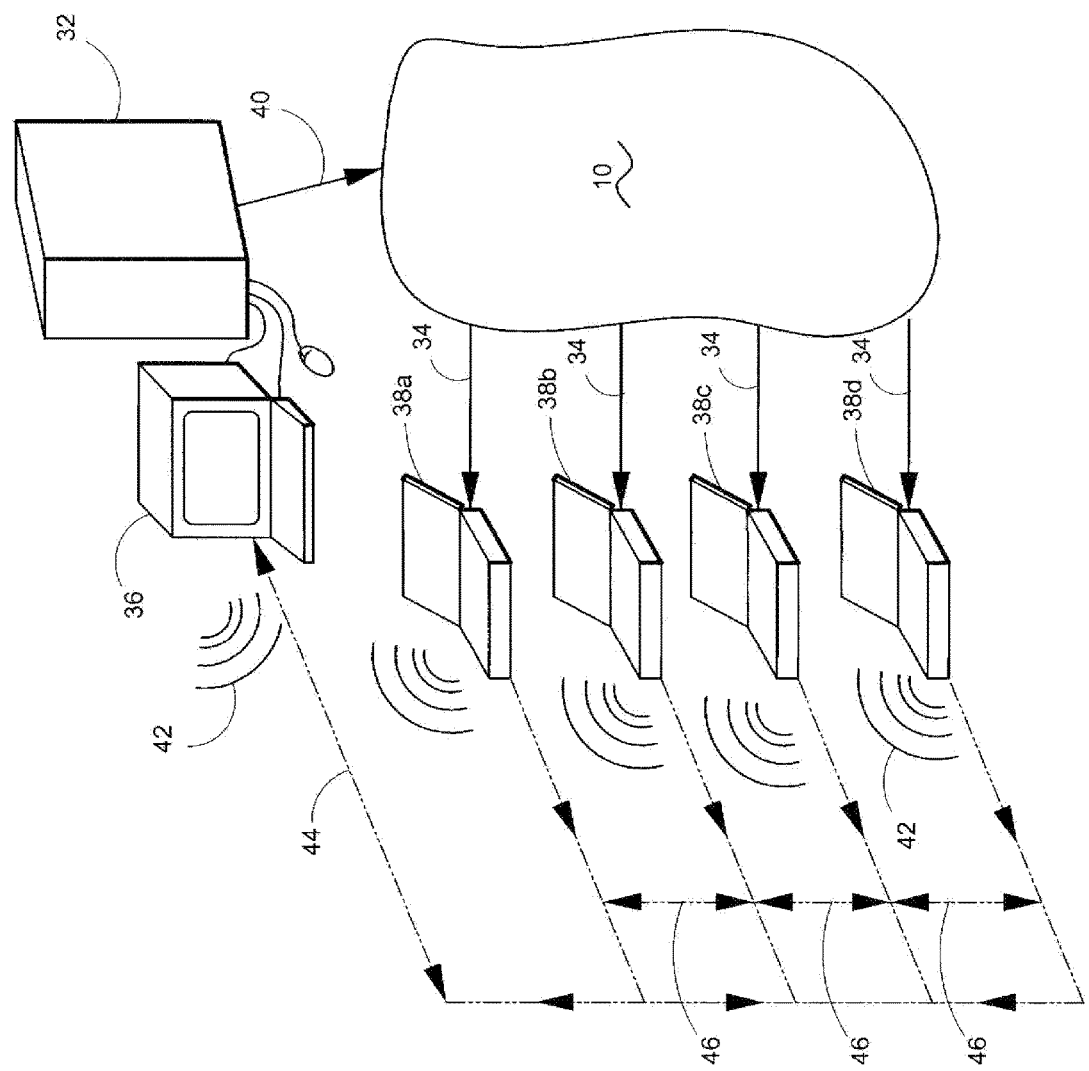
FIG. 9 demonstrates the system structure of an electronic interface according to one embodiment of the present invention.
Figure 10:
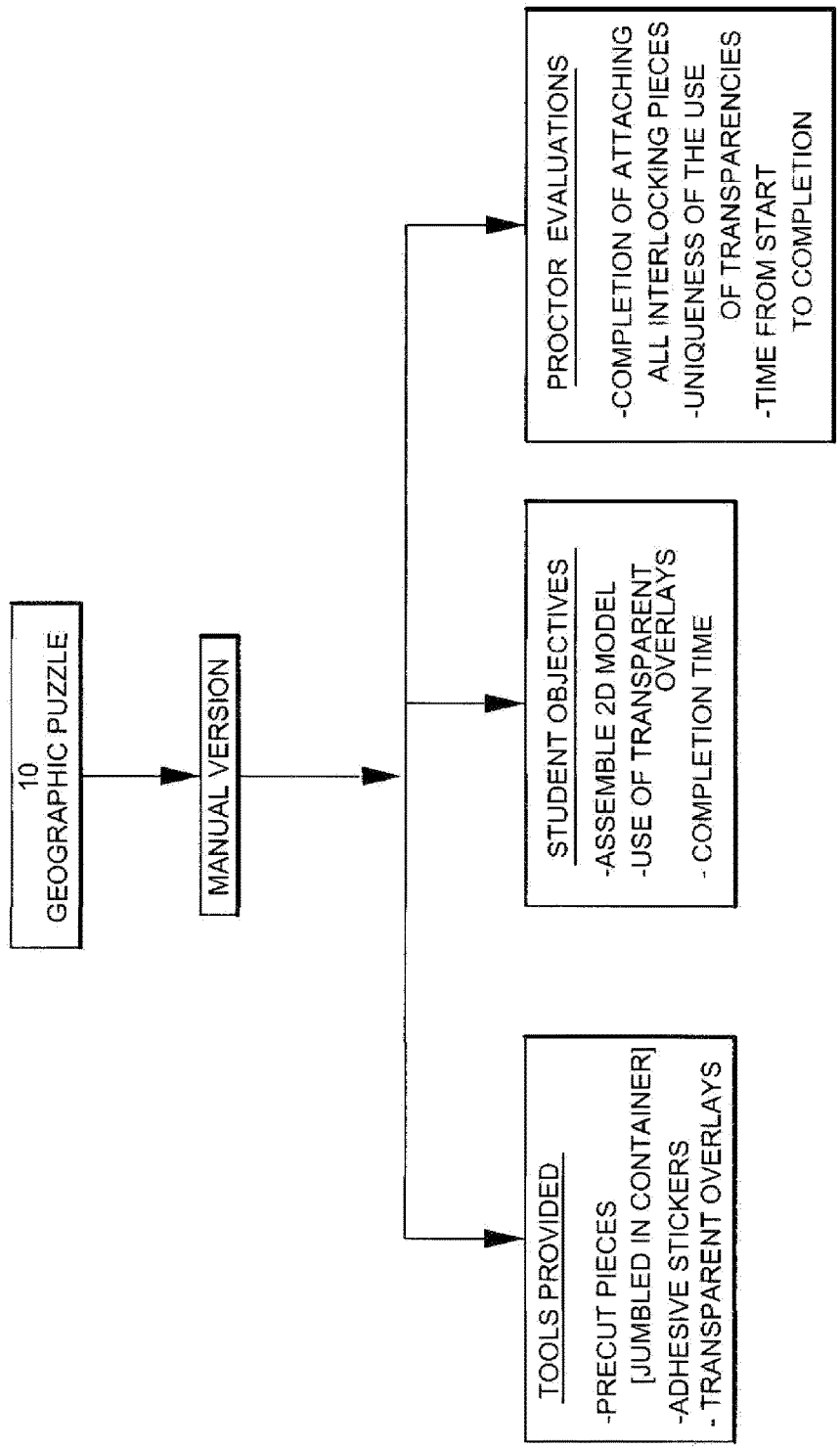
FIG. 10 is a schematic flow chart demonstrating one embodiment of use according to a manual embodiment.

As demonstrated in FIG. 9, in one embodiment of the present invention, a computer system 32 running application software 34 is operatively associated with map 10. System 32 performs data input and output in either a hard-wired configuration demonstrative of Fig. element 40, or a wireless communication demonstrative in Fig. element 42. Proctor monitor 36 will be manned by a teacher or other proctor to supervise use of the system. At least one student monitor 38 is operative associated with map 10. As demonstrated in the figure, each student monitor 38a, 38b, 38c, 38d, is constructed and arranged as being formatted for use in the system. In this embodiment, more than one student monitor is used. Fig. element 44 demonstrates student/proctor progress exchange during use of the present invention. Fig. element 46, according to one embodiment of the present invention, represents exchange of information between individual students.

In use, a student will be provided with a map system 10, typically in individual pieces. The individual pieces are then assembled into a map. In one embodiment, assembly is through a conventional jigsaw-type configuration. In another embodiment, the magnets as described herein. In yet another embodiment, pieces are assembled whereby each correct pairing of pieces transmits information to the computer-controlled system marking progress of assembly.

The system, as described herein is configured in one embodiment to have a component whereby information is electronically transmitted to a proctor computer in order to monitor and further facilitate learning.

The present invention further includes a teaching method comprising the steps of providing a system as described herein and interacting with a proctor based on electronic communication.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

What is claimed is:

1. A map system, said system comprising:
    a plurality of individual puzzle pieces having a first upper planar surface and a second lower planar surface;
    transparent overlays complimentary shaped to individual puzzle pieces to cover said individual puzzle pieces and configured to be removably positioned on top of said upper planer surface of said puzzle pieces;

a first unassembled configuration of said map system whereby said puzzle pieces are not positioned to form a complete map;

a second assembled configuration of said map system whereby said puzzle pieces are positioned to form a complete map, said complete map presenting an image from assembled pieces having printed indicia on said upper planar surface;

complementary electronic sensors, or complementary electronic sensors provided with complementary magnet pairs, positioned on said puzzle pieces, said electronic sensors configured for transmitting correct pairing of pieces transmits information to a computer-controlled system marking progress of assembly whereby said second assembled configuration is configured for teaching and learning.

2. The map system of claim 1, wherein said electronic sensors include transmission and receiving means configured for transmitting information about the relative state of assembly of said system or information about a completed map system to a proctor operating a computer system configured for communicating with said map system.

3. The map system of claim 1 wherein said first upper planar surface, said overlay, or both include three-dimensional indicia.

4. The map system of claim 1 wherein said first upper planar, said overlay, or both surface include three-dimensional Braille indicia.

* * * * *